United States Patent
Buehrle et al.

(10) Patent No.: US 12,386,348 B1
(45) Date of Patent: Aug. 12, 2025

(54) BUILDING INSPECTION SYSTEMS AND METHODS UTILIZING MANEUVERABLE BUILDING DETECTION DEVICES

(71) Applicant: United Services Automobile Association (USAA), San Antonio, TX (US)

(72) Inventors: Amber K. Buehrle, Phoenix, AZ (US); Ramsey Devereaux, San Antonio, TX (US); Michael Hertz, San Antonio, TX (US); Michael Kyne, Saint Petersburg, FL (US); Theresa Marie Matowitz, San Antonio, TX (US); Steven Robert Seigler, Tampa, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 167 days.

(21) Appl. No.: 17/245,272

(22) Filed: Apr. 30, 2021

Related U.S. Application Data

(60) Provisional application No. 63/018,251, filed on Apr. 30, 2020.

(51) Int. Cl.
| | |
|---|---|
| *G05D 1/00* | (2024.01) |
| *B62D 57/024* | (2006.01) |
| *G06Q 40/08* | (2012.01) |

(52) U.S. Cl.
CPC ......... *G05D 1/0088* (2013.01); *B62D 57/024* (2013.01); *G05D 1/0011* (2013.01);
(Continued)

(58) Field of Classification Search
CPC .. G05D 1/0088; G05D 1/0011; G05D 1/0231; G05D 1/101; B62D 57/024; B62D 57/04; G06Q 40/08
See application file for complete search history.

(56) References Cited

U.S. PATENT DOCUMENTS

| 6,115,694 A | 9/2000 | Cheetham et al. |
| 9,852,487 B1 | 12/2017 | Farnsworth et al. |
| | (Continued) | |

FOREIGN PATENT DOCUMENTS

| JP | 2018105846 A | * 7/2018 | ........... B64C 39/024 |
| JP | 2019084868 A | * 6/2019 | ............. G06K 15/10 |
| | (Continued) | | |

OTHER PUBLICATIONS

Machine translation WO 2017183636 (year: 2017).*
(Continued)

*Primary Examiner* — Anne Marie Antonucci
*Assistant Examiner* — Jordan T Smith
(74) *Attorney, Agent, or Firm* — Fletcher Yoder P.C.

(57) ABSTRACT

Systems and methods of the present disclosure include a system that includes a maneuverable building detection device configured to engage and maneuver along a wall of a building comprised of a plurality of building components. The maneuverable building detection device includes at least one building component detection sensor device. Each building component detection sensor device is configured to detect data relating to at least one building component of the plurality of building components. In certain embodiments, the system also includes a building component property determination system configured to automatically determine one or more properties of the at least one building component based at least in part on the data detected by the at least one building component detection sensor device. In addition, in certain embodiments, the system further includes a building insurance determination system configured to automatically determine insurance rates and/or insurance coverage for the building based at least in part on the one or more properties of the at least one building component determined by the building component property determination system.

19 Claims, 6 Drawing Sheets

(52) U.S. Cl.
CPC ........... *G05D 1/0231* (2013.01); *G05D 1/101* (2013.01); *G06Q 40/08* (2013.01)

(56) References Cited

U.S. PATENT DOCUMENTS

| | | |
|---|---|---|
| 9,939,810 B1 | 4/2018 | Matheson et al. |
| 10,162,348 B1 | 12/2018 | Scott et al. |
| 10,163,326 B1 | 12/2018 | Billman et al. |
| 10,354,386 B1 | 7/2019 | Farnsworth et al. |
| 10,365,646 B1 | 7/2019 | Farnsworth et al. |
| 10,373,256 B1 | 8/2019 | Allen et al. |
| 10,444,107 B1 | 10/2019 | Flachsbart et al. |
| 10,453,146 B1 | 10/2019 | Stricker et al. |
| 10,510,121 B2 | 12/2019 | Allen et al. |
| 10,521,865 B1 | 12/2019 | Spader et al. |
| 10,552,911 B1 | 2/2020 | Allen et al. |
| 11,105,735 B1* | 8/2021 | Gray .................. G01M 5/0033 |
| 2004/0153330 A1 | 8/2004 | Miller et al. |
| 2009/0265193 A1* | 10/2009 | Collins ............. G06Q 30/0185 |
| | | 901/46 |
| 2014/0279593 A1 | 9/2014 | Pershing |
| 2015/0088556 A1 | 3/2015 | Convery et al. |
| 2015/0094952 A1 | 4/2015 | Moeglein et al. |
| 2015/0228031 A1 | 8/2015 | Emison et al. |
| 2015/0235322 A1 | 8/2015 | Emison |
| 2015/0310557 A1 | 10/2015 | Engelhorn |
| 2015/0370986 A1 | 12/2015 | Hayward |
| 2017/0066530 A1* | 3/2017 | Salzmann ............... B64C 27/04 |
| 2017/0123435 A1* | 5/2017 | Myeong ................. B25J 9/1676 |
| 2018/0068185 A1* | 3/2018 | Schultz ................. G01S 19/39 |
| 2018/0130196 A1* | 5/2018 | Loveland ............... B64D 47/08 |
| 2019/0394448 A1 | 12/2019 | Ziegler et al. |
| 2020/0142052 A1* | 5/2020 | Liu ....................... G01S 13/865 |
| 2020/0174478 A1* | 6/2020 | Abdellatif ............ G05D 1/2446 |

FOREIGN PATENT DOCUMENTS

| | | | |
|---|---|---|---|
| KR | 20130098062 A | * 9/2013 | |
| WO | WO-2017183636 A1 | * 10/2017 | ............. B62D 57/04 |

OTHER PUBLICATIONS

Machine Translation JP 2018105846 (Year: 2018).*
Machine Translation of JP2019084868A (Year: 2019).*
Machine Translation of KR20130098062 (Year: 2013).*
S. Jung, J.-U. Shin, W. Myeong and H. Myung, "Mechanism and system design of MAV(Micro Aerial Vehicle)-type wall-climbing robot for inspection of wind blades and non-flat surfaces," 2015 15th International Conference on Control, Automation and Systems (ICCAS), Busan, Korea (South), 2015, pp. 1757-1761. (Year: 2015).*
Y. K. Song, C. M. Lee, I. M. Koo, D. T. Tran, H. Moon and H. R. Choi, "Development of wall climbing robotic system for inspection purpose," 2008 IEEE/RSJ International Conference on Intelligent Robots and Systems, Nice, France, 2008, pp. 1990-1995, doi: 10.1109/IROS.2008.4650885. (Year: 2008).*
Moreno et al.; "Recognition of Materials and Damage on Historical Buildings Using Digital Image Classification," South African Journal of Scient, vol. 111, n. 1-2 Pretoria Jan./Feb. 2015.

* cited by examiner

BUILDING INSPECTION SYSTEMS AND METHODS UTILIZING MANEUVERABLE BUILDING DETECTION DEVICES

CROSS-REFERENCE TO RELATED APPLICATION

The present disclosure is related to, and claims priority to, U.S. Provisional Patent Application Ser. No. 63/018,251, titled "Building Inspection Systems and Methods Utilizing Maneuverable Building Detection Devices," which was filed on Apr. 30, 2020, and which is herein incorporated by reference in its entirety for all purposes.

BACKGROUND

The present disclosure relates generally to building inspection detection systems. More specifically, the present disclosure relates to maneuverable building detection devices configured to detect properties of building components of buildings for the purpose of building inspections.

Buildings, such as houses used as homes, often need to be inspected to, for example, ascertain appropriate insurance rates and coverage, appraisals for mortgages, home valuations, and so forth. However, building inspections generally require building inspectors to inspect numerous components of the building, which can take a lot of time for individual building inspectors. As such, building inspection processes may benefit from advanced building component detection techniques.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Systems and methods of the present disclosure include a system that includes a maneuverable building detection device configured to engage and maneuver along a wall, a ceiling, and a floor of a building comprised of a plurality of building components. The maneuverable building detection device includes at least one building component detection sensor device. Each building component detection sensor device is configured to detect data relating to at least one building component of the plurality of building components. In certain embodiments, the system also includes a building component property determination system configured to automatically determine one or more properties of the at least one building component based at least in part on the data detected by the at least one building component detection sensor device. In addition, in certain embodiments, the system further includes a building insurance determination system configured to automatically determine insurance rates and/or insurance coverage for the building based at least in part on the one or more properties of the at least one building component determined by the building component property determination system.

In certain embodiments, a system includes a maneuverable building detection device configured to engage and autonomously maneuver along a wall, a ceiling, and a floor of a building comprised of a plurality of building components. The maneuverable building detection device is coupled to at least one building component detection sensor device. Each building component detection sensor device is configured to detect data relating to at least one building component of the plurality of building components.

In other embodiments, a method includes detecting data relating to at least one building component of a building comprised of a plurality of building components using at least one building component detection sensor device coupled to a maneuverable building detection device attached to and autonomously maneuvering along a wall, a ceiling, and a floor of the building. The method also includes automatically determining, using a building component property determination system, one or more properties of the at least one building component based at least in part on the data detected by the at least one building component detection sensor device.

In other embodiments, a system includes a maneuverable building detection device configured to engage and autonomously maneuver along a wall, a ceiling, and a floor of a building comprised of a plurality of building components. The maneuverable building detection device is coupled to at least one building component detection sensor device configured to detect data relating to at least one building component of the plurality of building components. The system also includes a building component property determination system configured to automatically determine one or more properties of the at least one building component based at least in part on the data detected by the at least one building component detection sensor device. The system further includes a building insurance determination system configured to automatically determine insurance rates and/or insurance coverage for the building based at least in part on the one or more properties of the at least one building component determined by the building component property determination system.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
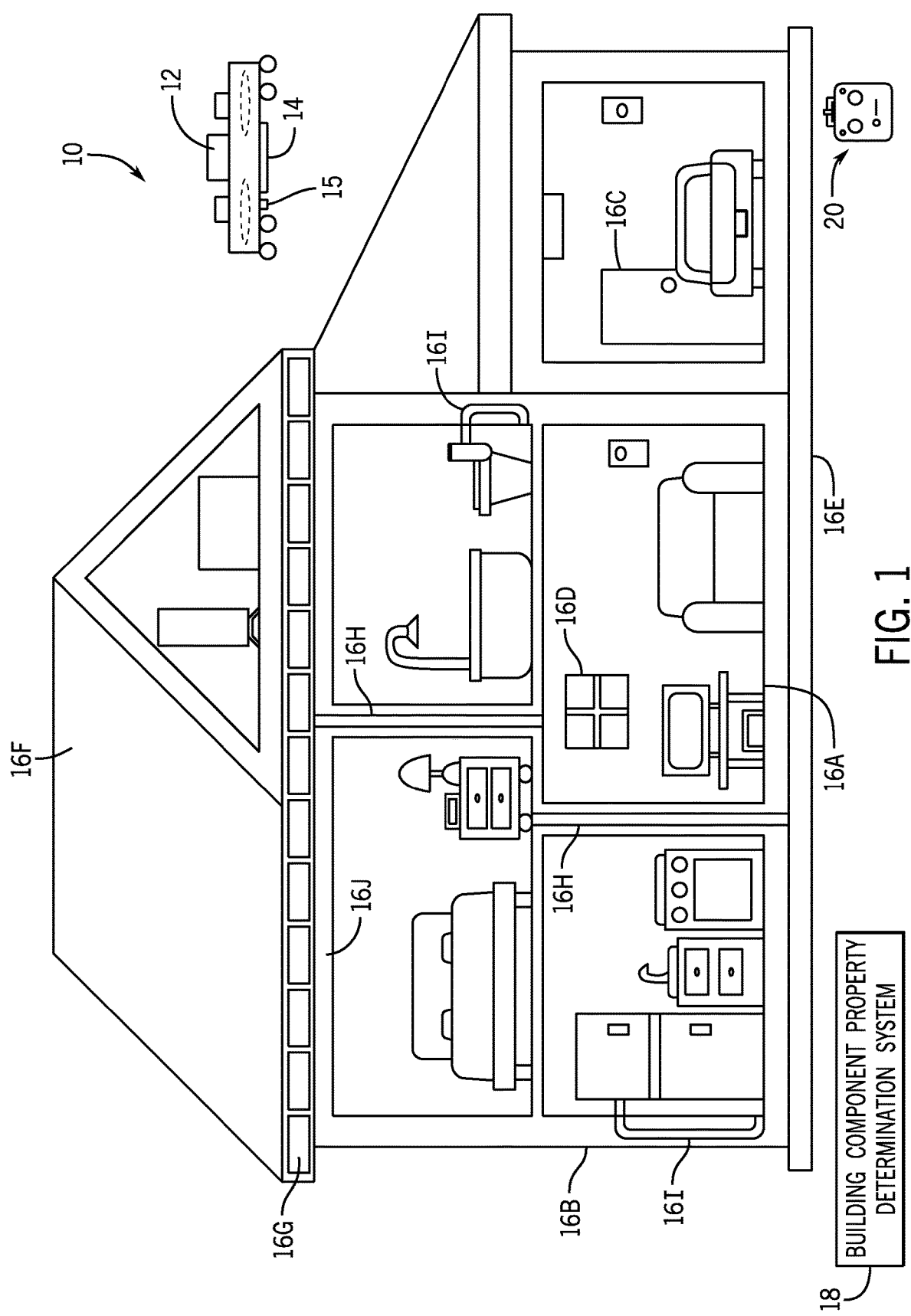
FIG. 1 illustrates a maneuverable building detection device and a building (e.g., a house) through and around which the maneuverable building detection device may be maneuvered such that one or more building component detection sensor devices coupled to the respective maneuverable building detection device may be brought into close proximity with building components of interest for the building, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the term "insurance" may refer to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments described herein, the insurance policy is not to be understood to be limited to a residential or homeowners insurance policy, but can be for a commercial, umbrella, and other insurance policies known by those skilled in the art.

As used herein, the terms "automatic" and "automatically" may refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions.

In addition, as used herein, the terms "autonomous" and "autonomously" may refer to actions (e.g., movements) that are performed by a maneuverable building detection device that is configured to maneuver about a physical environment (e.g., within and/or around a building) without human intervention. For example, autonomous movement of a maneuverable building detection device may be accomplished by the maneuverable building detection device without any guidance from a user, for example, using a remote control device to manually maneuver the maneuverable building detection device.

As used herein, the terms "real time" and substantially real time" may refer to actions that are performed substantially simultaneously with other actions, without any human-perceptible delay between the actions. For example, two functions performed in substantially real time occur within seconds (or even within milliseconds) of each other. As but one non-limiting example, two functions performed in substantially real time occur within 1 second, within 0.1 second, within 0.01 second, and so forth, of each other.

As used herein, the term "application" may refer to one or more computing modules, programs, processes, workloads, threads, and/or computing instructions executed by a computing system. Example embodiments of an application include software modules, software objects, software instances, and/or other types of executable code.

Present embodiments are generally directed toward using maneuverable building detection devices configured to detect properties of building components of buildings for the purpose of building inspections. In particular, the maneuverable building detection devices described herein may be configured to fly within or around a building of interest, as well as to drive around on floors and other generally horizontal surfaces of the building of interest, as well as climb walls and other generally vertical surfaces of the building of interest, such that the maneuverable building detection devices may be maneuvered adjacent building components of the building of interest for the purpose of detecting properties of the building components. For example, in certain embodiments, the maneuverable building detection devices may include building component detection sensor devices that, when the respective maneuverable building detection device is maneuvered adjacent a building component of interest, the building component detection sensor devices may detect properties of interest for the building component of interest. In certain embodiments, the maneuverable building detection devices may be remotely controllable. However, in other embodiments, the maneuverable building detection devices may be autonomous and may maneuver themselves proximate building components of interest by, for example, using image and/or position sensors as positioning feedback. Indeed, in certain embodiments, the maneuverable building detection devices may be configured to operate in both a manual maneuvering mode and an autonomous maneuvering mode, and may be configured to switch between the modes depending on a setting of the respective maneuverable building detection device, which may be toggled by a user of the respective maneuverable building detection device, for example.

In addition, instead of (or in addition to) being configured to drive around on floors and/or to climb walls, in certain embodiments, the maneuverable building detection devices may include optional extension attachments that are configured to be coupled to building component detection sensor devices and to move the building component detection sensor devices adjacent the floors and/or walls. For example, in such embodiments, the maneuverable building detection devices may remain in a relatively fixed position on the floors and/or walls while actuating the extension attachments to maneuver the building component detection sensor devices adjacent the floors and/or walls (e.g., with less pressure than the maneuverable building detection devices themselves would apply) to enable the building component detection sensor devices to detect properties of interest for the building component of interest.

In certain embodiments, the building component detection sensor devices of the maneuverable building detection devices may include sound detection sensor devices, vibration detection sensor devices, light detection sensor devices, temperature detection sensor devices, pressure detection sensor devices, humidity detection sensor devices, camera devices configured to capture images relating to the building components and/or the building itself, and so forth, which are configured to collect data relating to the building. In certain embodiments, a building component property determination system may automatically determine certain properties of certain building components of the building based at least in part on the data collected by the building component detection sensor devices. For example, a building component detection sensor device of a maneuverable building detection device may be maneuvered into close proximity to a building component, such as flooring, siding, doors, windows, foundation, roof, insulation, pier and beam construction, and so forth, and may detect sound, vibration, light, and so forth, in the area of the building component. Based at least in part on the detected sound, vibration, light, and so forth, the building component property determination system may automatically determine properties of the building component, such as a type of material the building component is made of, a quality of the building component, an integrity of the building component, and other conditions of the building component.

In certain embodiments, the determined properties may be used to verify construction standards for the building, such as maximum winds that may be withstood by the building. In addition, in certain embodiments, a building insurance determination system may automatically determine insurance rates and/or insurance coverage based at least in part on these determined properties. Alternatively, or in addition to, in certain embodiments, the determined properties may be used to automatically determine other things related to the building including, but not limited to, appraisals for mortgages relating to the building, inspections and/or home valuations relating to the building (e.g., for banks, tax offices, and so forth), and so forth.

The embodiments described herein provide numerous advantages over prior art systems. For example, the maneuverable building detection devices described herein enable more automated detection of properties of building components of buildings. In certain embodiments, prior to using this system, the layout (e.g., size of a room, wall positioning, furniture positioning, and so forth) of the building (or portion of the building, such as a room) may be assessed and utilized for calibration. For example, in certain embodiments, the layout may be manually input, for example, using a user interface with an interactive map displayed therein. In certain embodiments, the layout of the building may be imported from public data, such as publicly available floor plans. In other embodiments, camera data and/or sound data may be utilized to establish the layout of the building (or portion of the building, such as a room). Furthermore, in other embodiments, wireless signals transmitted via a local wireless network may be utilized to detect the layout of the building (or portion of the building, such as a room). For example, in certain embodiments, a signal strength of a wireless signal (e.g., such as a WiFi™ signal) broadcast throughout the building may be detected by a device, and the layout of the building may be automatically determined based on signal strength variations as the device moves through the building. In addition, in certain embodiments, the layout of the building may be automatically determined based on images and/or video captured by a camera device associated with the maneuverable building detection devices described herein.

In certain embodiments, one or more maneuverable building detection devices may be utilized to maneuver their respective building component detection sensor devices through or around (e.g., flying through or around the building, driving over floors or other generally horizontal surfaces of the building, and/or climbing up walls or other generally vertical surfaces of the building, to bring the building component detection sensor devices into position proximate to building components of interest, and so forth) the building (or portion of the building, such as a room). In certain embodiments, corrections for movement of the maneuverable building detection devices may be detected to more accurately assess, for example, reflected sound and automatically determine associated relative distances, materials, and so forth. In certain embodiments, the maneuverable building detection devices may only listen for or only provide the sound while other devices may provide the corresponding sound emission or listening function. In embodiments utilizing multiple devices (e.g., a single sound emission source is used with multiple detection devices), access to a local wireless network may facilitate location determination of relevant building components.

The embodiments described herein may also enable identification of plumbing disposed within the building. In addition, the embodiments described herein may also facilitate tree identification and/or the presence of certain soil characteristics, such as soil root, limestone shelf, and so forth, which may be used to provide suggestions for placement of trees around the building. In addition, the embodiments described herein may facilitate the detection of early warning signals of potential or impending damage to the building in order to prevent and/or minimize costs of losses due to delay in maintenance or emergency mitigation response, which may be detected by the building component detection sensor devices described herein. For example: early detection of certain conditions, such as foundation issues, roof damage, cracks, unexpected heat or temperature change patterns, moisture content, presence of mold in walls, and so forth, may all be detected by the building component detection sensor devices described herein, and may be acted upon by the building component property determination system described herein.

By way of introduction, FIG. 1 illustrates a building 10 (e.g., a house) through and around which one or more maneuverable building detection devices 12 may be maneuvered such that one or more building component detection sensor devices 14 coupled to the respective maneuverable building detection devices 12 may be brought into close proximity with building components 16 of interest for the building 10 such that the building component detection sensor devices 14 may detect properties of the building components 16. As used herein, the terms "proximate to" and "in close proximity" are intended to mean, for example, positioning of a maneuverable building detection device 12 and/or a building component detection sensor device 14 within or around the building 10 in close enough proximity (e.g., within 20 feet, within 15 feet, within 10 feet, within 5 feet, within 2 feet, within 1 foot, or even closer) to a building component 16 of interest such that the building component detection sensor device 14 may collect data associated with the building component 16 of interest. In addition, in certain embodiments, the maneuverable building detection devices 12 may include one or more sampling devices 15 configured to take samples relating to building components 16 when the respective maneuverable building detection device 12 maneuvers the sampling devices 15 into close proximity with a building component 16 of interest or, indeed, when the respective maneuverable building detection device 12 is engaging (e.g., is attached to) and maneuvering along a wall, a ceiling, or a floor of the building 10, as described in greater detail herein.

As described in greater detail herein, the building component detection sensor devices 14 may include, but are not limited to, sound detection sensor devices, vibration detection sensor devices, light detection sensor devices, temperature detection sensor devices, pressure detection sensor devices, humidity detection sensor devices, moisture detection sensor devices, camera devices (e.g., either standard camera devices or thermal imaging devices, as described in greater detail herein) configured to capture images relating to the building components and/or the building itself, and so forth. In addition, as also illustrated in FIG. 1, in certain embodiments, certain building components 16 of interest of the building 10 may include, but are not limited to, flooring 16A, siding 16B, doors 16C, windows 16D, foundation 16E, roof 16F, insulation 16G, pier and beam construction within walls 16H, plumbing 16I, and so forth.

In general, the building component detection sensor devices 14 of the maneuverable building detection devices 12 may be maneuvered into close proximity to building components 16 of interest of a building 10 for the purpose of collecting data relating to the building components 16 to enable a building component property determination system 18 to automatically determine properties of the building components 16, such as types of materials the building components 16 are made of, qualities of the building components 16, integrities of the building components 16, and other conditions (e.g., age, degree of wear, and so forth) of the building components 16 for the purpose of aiding a building inspector inspecting the building 10. Furthermore, as described in greater detail herein, in certain embodiments, the determined properties of the one or more building components 16 may be used to automatically determine insurance rates and/or insurance coverage relating to the building 10. Alternatively, or in addition to, in certain embodiments, the determined properties of the one or more building components 16 may be used to automatically determine other things related to the building 10 including, but not limited to, appraisals for mortgages relating to the building 10, home valuations relating to the building 10 (e.g., for banks, tax offices, and so forth), and so forth.

Various types of building component detection sensor devices 14 may be used to detect various types of data relating to properties of building components 16 of buildings 10. For example, in certain embodiments, sound detection sensor devices 14 may be used to detect sound waves reflected off of a particular building component 16. In certain embodiments, the sound detection sensor devices 14 may emit sound waves that are reflected back from the particular building component 16. However, in other embodiments, the sound waves that are reflected off of the particular building component 16 may emanate from other external sound sources. In other embodiments, vibration detection sensor devices 14 may be used to detect other types of vibrations reflected off of a particular building component 16. Similar to the sound detection sensors devices 14, in certain embodiments, the vibration detection sensor devices 14 may emit the vibrations that are reflected back from the particular building component 16. However, in other embodiments, the vibrations that are reflected off of the particular building component 16 may emanate from other external vibration sources. In other embodiments, light detection sensor devices 14 may be used to detect light reflected off of a particular building component 16. Similar to the sound detection sensors devices 14 and the vibration detection sensor devices 14, in certain embodiments, the light detection sensor devices 14 may emit the light that is reflected back from the particular building component 16. However, in other embodiments, the light that is reflected off of the particular building component 16 may emanate from other external light sources.

In certain embodiments, multiple types of building component detection sensor devices 14 may be coupled to a respective maneuverable building detection device 12. In such embodiments, the multiple building component detection sensor devices 14 may communicate with each other using communication circuitry, as described in greater detail herein, to coordinate detection of properties of the building components 16. In addition, in certain embodiments, the multiple building component detection sensor devices 14 may also communicate with the respective maneuverable building detection device 12 using communication circuitry, as described in greater detail herein, to enable the respective maneuverable building detection device 12 to autonomously maneuver the multiple building component detection sensor devices 14 such that the multiple building component detection sensor devices 14 may detect properties of the building components 16, for example, one after the other. In addition, in certain embodiments, processing circuitry of the multiple building component detection sensor devices 14 and the maneuverable building detection device 12, as described in greater detail herein, may coordinate with each other to automatically switch operation between the building component detection sensor devices 14 depending on, for example, the type of property of interest of a particular building component 16 that is of interest, a type of building component 16 to which the maneuverable building detection device 12 is proximate, and so forth. For example, in certain embodiments, the processing circuitry of the multiple building component detection sensor devices 14 and/or of the maneuverable building detection device 12, described in greater detail herein, may be configured to individually and/or collectively determine a type of a particular building component 16 of interest, may automatically determine which building component detection sensor device 14 should be used at any given time based on the determined type of the particular building component 16 of interest and/or based on a particular property of interest for the particular building component 16 of interest, and may automatically switch operation to the determined building component detection sensor device 14.

In addition, in certain embodiments, processing circuitry of the building component detection sensor devices 14 and/or of the maneuverable building detection device 12, described in greater detail herein, may be configured to automatically adjust operating parameters of the respective building component detection sensor devices 14, for example, based on a determined type of the particular building component 16 of interest and/or based on a particular property of interest for the particular building component 16 of interest to enable the building component detection sensor devices 14 to more accurately detect the properties of interest of the particular building component 16 of interest. For example, if the particular building component 16 of interest is determined to be a particular type of flooring 16A, the processing circuitry of a sound detection sensor device 14 may adjust the frequency of sound waves emitted from the sound detection sensor device 14 to more accurately detect the condition of the particular type of flooring 16A.

In certain embodiments, camera devices 14 may be used to capture images relating to the building components 16 and/or the building 10 itself to, for example, capture time lapse video around the building 10 to show progression of construction of the building 10 over the time it is built. For example, in certain embodiments, a camera device 14 may include a combination of a visible light (RGB) camera configured to detect visible light (e.g., light having a wavelength of between approximately 380 nanometers and approximately 740 nanometers) and an infrared camera configured to detect invisible light (e.g., light having a wavelength of between approximately 740 nanometers and approximately 1 millimeter). In such embodiments, the visible light (RGB) camera of the camera device 14 may be configured to detect certain visible properties of the building components 16 (e.g., types of material, visible cracks, and so forth), whereas the infrared camera of the camera device 14 may be configured to detect certain properties of the building components 16 that are not visible to the camera device 14 (e.g., internal damage, leaks in pipes behind walls 16H, cracks within a foundation 16E, and so forth). In addition, in such embodiments, the camera device 14 may be configured to use both the visible light (RGB) camera and the infrared camera together (e.g., at the same time), or may automatically switch between the visible light (RGB) camera and the infrared camera depending on, for example, the type of property of interest of a particular building component 16 that is of interest, a type of building component 16 to which the camera device 14 is proximate, and so forth. For example, in certain embodiments, processing circuitry of the camera device 14 and/or of the maneuverable building detection device 12, described in greater detail herein, may be configured to determine a type of a particular building component 16 of interest, may automatically determine which type of camera should be used based on the determined type of the particular building component 16 of interest and/or based on a particular property of interest for the particular building component 16 of interest, and may automatically switch operation to the determined type of camera.

Regardless of the type of building component detection sensor devices 14 used, the relative position of the building component detection sensor devices 14 with respect to building components 16 of interest will have an effect on the determination of the properties of the building components 16, which is performed by the building component property determination system 18. To that end, as described in greater detail herein, the relative position of the maneuverable building detection device 12 (i.e., having the building component detection sensor devices 14) with respect to building components 16 of interest may be automatically determined by the building component property determination system 18 using, for example, position data received from the particular maneuverable building detection device 12 and/or its associated building component detection sensor devices 14, data relating to layouts of building components 16 and other features of the building 10, and so forth.

Although described in reference to FIG. 1 as being building component detection sensor devices 14 that have a particular type of detection functionality, in certain embodiments, a given building component detection sensor device 14 may actually include multiple different types of sensors that are configured to detect multiple different types of properties relating to multiple different types of building components 16, and the different sensors may be used at different times. For example, in certain embodiments, a given building component detection sensor device 14 may include any combination of sound detection sensors, vibration detection sensors, light detection sensors, temperature detection sensors, pressure detection sensors, humidity detection sensors, camera devices configured to capture images relating to the building components and/or the building itself, and so forth, and the various sensors may be activated at different times. In addition, in certain embodiments, the different combinations of sensors in any given building component detection sensor device 14 may be used together to determine the properties of building components 16. As but one non-limiting example, a given building component detection sensor device 14 may include both a pressure detection sensor and a humidity detection sensor, the data detected by both being usable to determine moisture experienced by a particular building component 16.

In certain embodiments, data collected by one or more building component detection sensor devices 14 may be used by the building component property determination system 18 to, for example, automatically determine a type and/or quality of material (e.g., type of tile or wood) of which flooring 16A of the building 10 is comprised. For example, in certain embodiments, sound and/or vibration may be detected by sound detection sensor devices 14 and/or vibration detection sensor devices 14 that are proximate to the flooring 16A. In certain embodiments, the one or more building component detection sensor devices 14 may be brought into close proximity to the flooring 16A by a maneuverable building detection device 12 that flies proximate the flooring 16A and/or drives directly over the flooring 16A, as described in greater detail herein.

In other embodiments, data collected by one or more building component detection sensor devices 14 may be used by the building component property determination system 18 to, for example, automatically determine a type and/or quality of material of which siding 16B of the building 10 is comprised. For example, in certain embodiments, sound, vibration and/or temperature differentials may be detected by sound detection sensor devices 14, vibration detection sensor devices 14, and/or temperature and/or pressure detection sensor devices 14 that are proximate to the siding 16B. In certain embodiments, the one or more building component detection sensor devices 14 may be brought into close proximity to the siding 16B by a maneuverable building detection device 12 that flies proximate the siding 16B and/or climbs the siding 16B, as described in greater detail herein.

In other embodiments, data collected by one or more building component detection sensor devices 14 may be used by the building component property determination system 18 to, for example, automatically determine a type and/or quality of material of which a door 16C of the building 10 is comprised, an integrity of the door 16C, and so forth. For example, in certain embodiments, sound and/or vibration may be detected by sound detection sensor devices 14 and/or vibration detection sensor devices 14 that are proximate to the door 16C. In certain embodiments, the one or more building component detection sensor devices 14 may be brought into close proximity to the door 16C by a maneuverable building detection device 12 that flies proximate the door 16C and/or climbs the door 16C, as described in greater detail herein.

In other embodiments, data collected by one or more building component detection sensor devices 14 may be used by the building component property determination system 18 to, for example, automatically determine a type and/or quality of material (type of a pane of glass of the window 16D, type of safety/UV film of the window 16D, and so forth) of which a window 16D of the building 10 is comprised, an integrity of the window 16D, number of panes of glass of the window 16D, and so forth. For example, in certain embodiments, light and/or temperature differentials may be detected by light detection sensor devices 14 and/or temperature and/or pressure detection sensor devices 14 that are proximate to the window 16D. In certain embodiments, the one or more building component detection sensor devices 14 may be brought into close proximity to the window 16D by a maneuverable building detection device 12 that flies proximate the window 16D and/or climbs the window 16D, as described in greater detail herein.

In other embodiments, data collected by one or more building component detection sensor devices 14 may be used by the building component property determination system 18 to, for example, automatically determine a type of foundation 16E of the building 10, an integrity of the foundation 16E, and so forth. In addition, in certain embodiments, data collected by one or more building component detection sensor devices 14 may be used by the building component property determination system 18 to, for example, detect slopes of the foundation 16E and/or whether or not drainage created by the foundation 16E is designed to lead water away from the building 10. For example, in certain embodiments, sound and/or vibration may be detected by sound detection sensor devices 14 and/or vibration detection sensor devices 14 that are proximate to the foundation 16E. In certain embodiments, the one or more building component detection sensor devices 14 may be brought into close proximity to the foundation 16E by a maneuverable building detection device 12 that flies proximate the foundation 16E and/or drives directly over the foundation 16E, as described in greater detail herein.

In other embodiments, data collected by one or more building component detection sensor devices 14 may be used by the building component property determination system 18 to, for example, automatically determine a type and/or quality of material of which a roof 16F of the building 10 is comprised, whether solar panels are being used for the building 10, and so forth. For example, in certain embodiments, sound and/or vibration may be detected by sound detection sensor devices 14 and/or vibration detection sensor devices 14 that are proximate to the roof 16F. In certain embodiments, the one or more building component detection sensor devices 14 may be brought into close proximity to the roof 16F by a maneuverable building detection device 12 that flies proximate the roof 16F and/or drives directly over the roof 16F, as described in greater detail herein.

In other embodiments, data collected by one or more building component detection sensor devices 14 may be used by the building component property determination system 18 to, for example, automatically determine a type of insulation 16G of the building 10. For example, in certain embodiments, sound, vibration, and/or temperature differentials may be detected by sound detection sensor devices 14, vibration detection sensor devices 14, and/or temperature and/or pressure detection sensor devices 14 that are proximate to the insulation 16G. In certain embodiments, the one or more building component detection sensor devices 14 may be brought into close proximity to the insulation 16G by a maneuverable building detection device 12 that flies proximate flooring 16A, a wall 16H, and/or a ceiling 16J that is adjacent the insulation 16G, climbs a wall 16H that is adjacent the insulation 16G, and/or drives directly over flooring 16A that is adjacent the insulation 16G, as described in greater detail herein.

In other embodiments, data collected by one or more building component detection sensor devices 14 may be used by the building component property determination system 18 to, for example, automatically determine a type or location of pier and beam construction within walls 16H of the building 10. For example, in certain embodiments, sound and/or vibration may be detected by sound detection sensor devices 14 and/or vibration detection sensor devices 14 that are proximate to the pier and beam construction. In addition, in certain embodiments, moisture detection sensor devices 14 and/or camera devices 14 (e.g., thermal imaging devices) may be used to detect moisture within and/or on surfaces of walls 16H of the building 10, which may indicate the presence of mold within and/or on the surfaces of the walls 16H. In certain embodiments, the one or more building component detection sensor devices 14 may be brought into close proximity to the walls 16H by a maneuverable building detection device 12 that flies proximate the walls 16H and/or climbs the walls 16H, as described in greater detail herein.

In other embodiments, data collected by one or more building component detection sensor devices 14 may be used by the building component property determination system 18 to, for example, automatically determine a type or location of plumbing 16I of the building 10. For example, in certain embodiments, sound and/or vibration may be detected by sound detection sensor devices 14 and/or vibration detection sensor devices 14 that are proximate to the plumbing 16I. In certain embodiments, the one or more building component detection sensor devices 14 may be brought into close proximity to the plumbing 16I by a maneuverable building detection device 12 that flies proximate flooring 16A, a wall 16H, and/or a ceiling 16J that is adjacent the plumbing 16I, climbs a wall 16H that is adjacent the plumbing 16I, and/or drives directly over flooring 16A that is adjacent the plumbing 16I, as described in greater detail herein.

As illustrated in FIG. 1, in certain embodiments, a maneuverable building detection device 12 may be used to carry one or more building component detection sensor devices 14 within an interior of the building 10 and/or around an exterior of the building 10 such that the one or more building component detection sensor devices 14 may detect data relating to one or more building components 16 of the building 10. In particular, in certain embodiments, the maneuverable building detection device 12 may be directly coupled to the one or more building component detection sensor devices 14, and may maneuver the one or more building component detection sensor devices 14 into close proximity to (e.g., landing on, flying/driving over, climbing, and so forth) the building components 16 such that the one or more building component detection sensor devices 14 may detect data relating to the building components 16.

In such embodiments, the building component property determination system 18 may take position and movement of the maneuverable building detection device 12 into consideration when determining the properties of the building components 16. For example, a current position of the maneuverable building detection device 12 may be used by the building component property determination system 18 to automatically determine a current position of the one or more building component detection sensor devices 14 of the maneuverable building detection device 12, which in turn may be used by the building component property determination system 18 to automatically determine a relative position of the one or more building component detection sensor devices 14 of the maneuverable building detection device 12 to a building component 16 of interest for the purpose of determining the properties of the building component 16, as well as determining how to maneuver the maneuverable building detection device 12 proximate to the building component 16 of interest. In addition, in certain embodiments, images of at least portions of the building 10 may be captured by cameras of the one or more building component detection sensor devices 14, and the captured images may be used to automatically determine relative positioning of a respective building component detection sensor device 14 of the maneuverable building detection device 12 relative to a particular building component 16 captured in the images for the purpose of determining how to maneuver the respective building component detection sensor device 14 relative to the particular building component 16, for example, via a respective maneuverable building detection device 12.

As such, in certain embodiments, the building component property determination system 18 may be configured to autonomously maneuver the maneuverable building detection devices 12 relative to building components 16 of buildings 10. However, in other embodiments, the maneuverable building detection devices 12 may be configured to autonomously maneuver themselves relative to building components 16 of buildings 10, for example, based on instructions stored and executed internally by the maneuverable building detection devices 12. In contrast, in other embodiments, a remote control device 20 may be used, for example, by a building inspector to manually manipulate the positioning of the maneuverable building detection devices 12 relative to building components 16 of buildings 10 by, for example, sending control signals to the maneuverable building detection devices 12. In certain embodiments, a combination of automatic maneuvering and manual maneuvering of the maneuverable building detection devices 12 may be used. For example, in certain embodiments, the maneuverable building detection devices 12 may be configured to operate in both a manual maneuvering mode and an autonomous maneuvering mode, and may be configured to switch between the maneuvering modes depending on a setting of the respective maneuverable building detection device 12, which may be toggled by a user of the respective maneuverable building detection device 12, for example.

Figure 2:
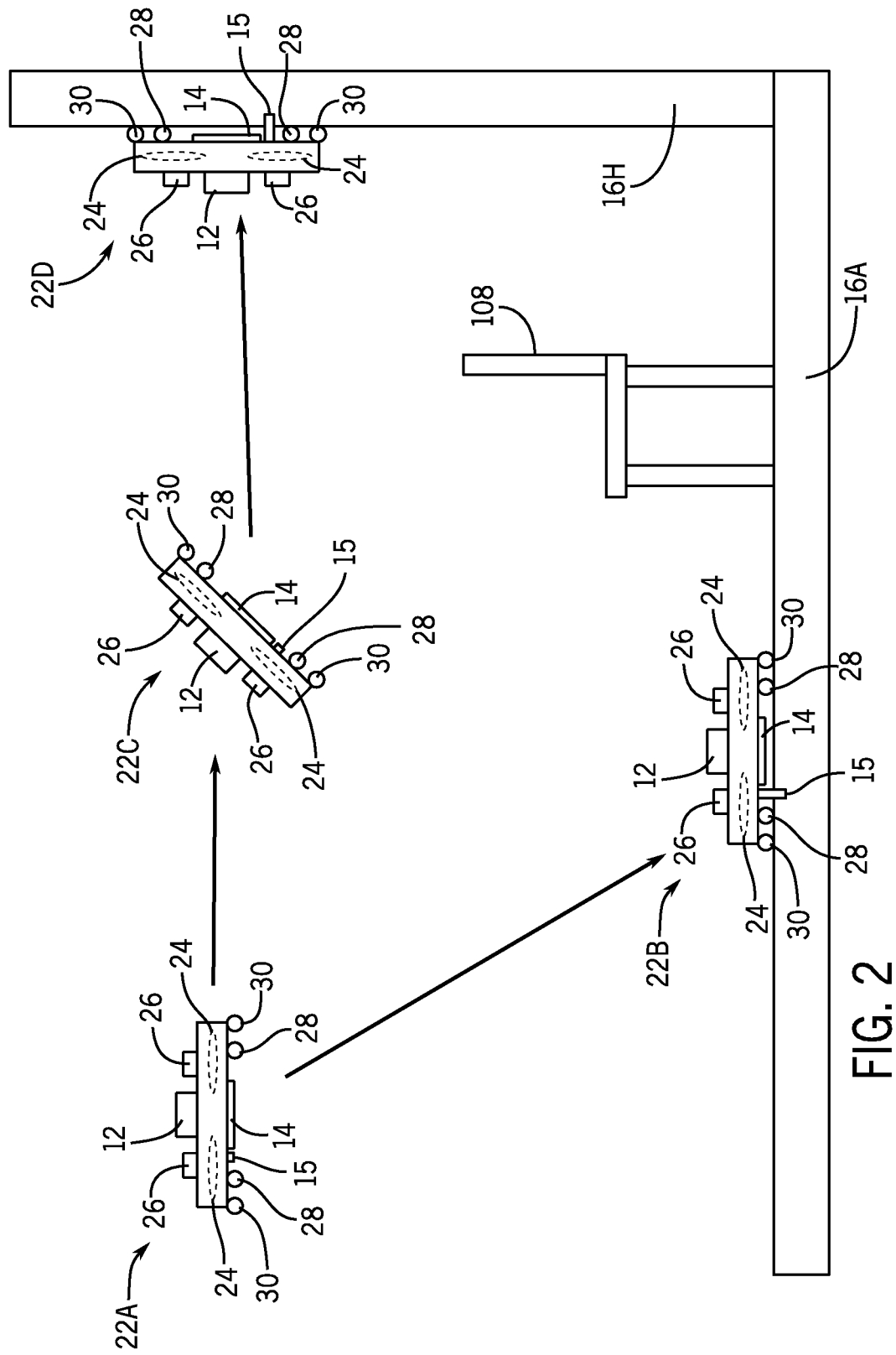
FIG. 2 illustrates various movement modes of a maneuverable building detection device relative to flooring and a wall of a building, in accordance with embodiments described herein.

To illustrate the functionality of the maneuverable building detection devices 12 described herein, FIG. 2 illustrates various movement modes of a maneuverable building detection device 12 relative to flooring 16A and a wall 16H of a building 10. For example, FIG. 2 illustrates a maneuverable building detection device 12 in a flight mode 22A utilizing a plurality of rotors 24, each driven by a respective motor 26, to control flight of the maneuverable building detection device 12. From the flight mode 22A, the maneuverable building detection device 12 may land on the flooring 16A such that a plurality of wheels 28 contact the flooring 16A. At this point, the plurality of wheels 28 may be used to control movement of the maneuverable building detection device 12 along the flooring 16A in a driving mode 22B such that a building component detection sensor device 14 coupled to the maneuverable building detection device 12 may detect one or more properties of the flooring 16A or other building components 16 proximate the flooring 16A, as described in greater detail herein. Conversely, from the flight mode 22A, the maneuverable building detection device 12 may instead engage (e.g., attach to) and maneuver along (e.g., climb) the wall 16H. To do so, the plurality of rotors 24 may be manipulated by the plurality of motors 26 to cause the maneuverable building detection device 12 to slowly change attitude in a wall-approach mode 22C until a plurality of wall-attachable wheels 30 make contact with the wall 16H in a wall/ceiling attachment mode 22D. At this point, the plurality of wall-attachable wheels 30 may be used to control climbing of the maneuverable building detection device 12 along the wall 16H such that the building component detection sensor device 14 may detect one or more properties of the wall 16H or other building components 16 proximate the wall 16H, as described in greater detail herein. Various types of wall-attachable wheels 30 may be used including, but not limited to, magnetic wheels, adhesive wheels, vacuum adhesion wheels, and so forth. It will be appreciated that the wall-attachable wheels 30 may also enable the maneuverable building detection device 12 to engage (e.g., attach to) ceilings 16J, flooring 16A, and other structures within the building 10.

In addition, instead of (or in addition to) being configured to drive around on floors 16A and/or to climb walls 16H, in certain embodiments, the maneuverable building detection devices 12 may include optional extension attachments that are configured to be coupled to building component detection sensor devices 14 and to move the building component detection sensor devices 14 adjacent the floors 16A and/or walls 16H. For example, in such embodiments, the maneuverable building detection devices 12 may remain in a relatively fixed position on the floors 16A and/or walls 16H while actuating the extension attachments to maneuver the building component detection sensor devices 14 adjacent the floors 16A and/or walls 16H (e.g., with less pressure than the maneuverable building detection devices 12 themselves would apply) to enable the building component detection sensor devices 14 to detect properties of interest for the building component 16 of interest.

In addition, in certain embodiments, the maneuverable building detection devices 12 may include one or more sampling devices 15 configured to take samples relating to building components 16 when the respective maneuverable building detection device 12 maneuvers the sampling devices 15 into close proximity with a building component 16 of interest or, indeed, when the respective maneuverable building detection device 12 is engaging (e.g., is attached to) and driving along the flooring 16A in the driving mode 22B or climbing the wall 16H in the wall/ceiling attachment mode 22D, as described in greater detail herein. For example, as illustrated in FIG. 2, at certain times when the maneuverable building detection device 12 is proximate a building component 16 of interest (e.g., flooring 16A in a driving mode 22, a wall 16H in a wall/ceiling attachment mode 22D, and so forth), a sampling device 15 may be extended into the building component 16 to extract a small portion of the building component 16 and/or to directly sample a property (e.g., moisture, integrity, and so forth) of the building component 16. In certain embodiments, the sampling devices 15 may include tiny needle-like extensions configured to extend into building components 16, tiny scoop-like devices configured to scrape and scoop small portions of building components 16, or any other suitable sampling devices 15. It will be appreciated that manipulation of the sampling devices 15 may be accomplished either manually via human manipulation of a remote control device 20 or automatically via processing circuitry of the building component detection sensor devices 14 and/or of the maneuverable building detection devices 12, as described in greater detail herein.

Figure 3:
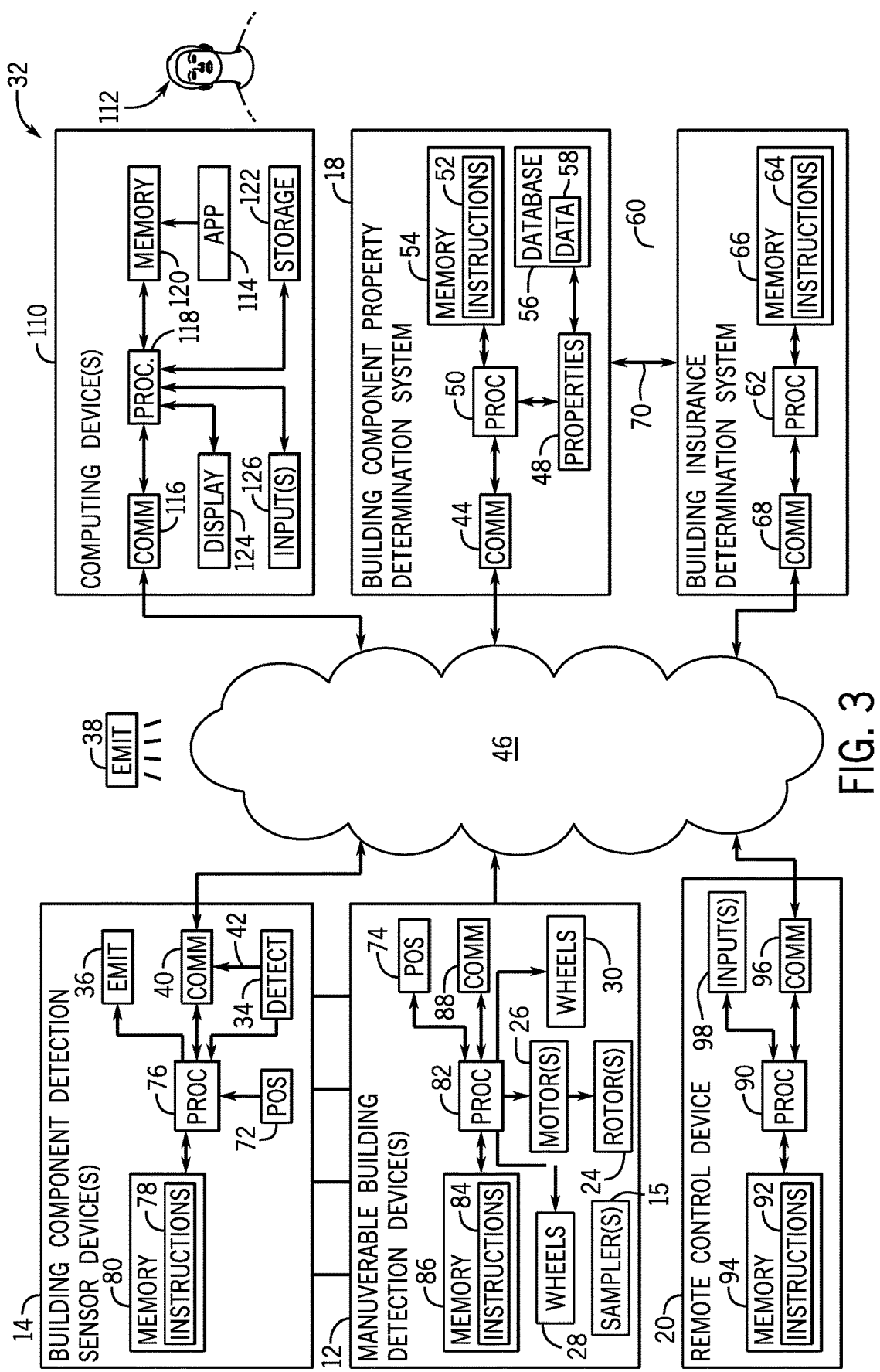
FIG. 3 is a block diagram of a system that includes a building component property determination system configured to automatically determine properties of one or more building components of a building using data detected by one or more building component detection sensor devices, in accordance with embodiments described herein.

FIG. 3 is a block diagram of a system 32 that includes a building component property determination system 18 configured to determine properties of one or more building components 16 of a building 10 using data detected by one or more building component detection sensor devices 14, in accordance with embodiments described herein. As illustrated in FIG. 3, each of the building component detection sensor devices 14 may include detection components 34 configured to detect, for example, certain types of sound waves, vibration waves, light waves, or combinations thereof. In addition, as described in greater detail herein, the building component detection sensor devices 14 may include emitter components 36 configured to emit, for example, certain types of sound waves, vibration waves, light waves, or combinations thereof, which are reflected back from building components 16 of interest. However, as also described in greater detail herein, the building component detection sensor devices 14 may not include emitter components 36 but, rather, may detect waves that are emitted by one or more external emitter sources 38, such as equipment specifically configured to emit, for example, certain types of sound waves, vibration waves, light waves, or combinations thereof. Indeed, in certain embodiments, the one or more external emitter sources 38 may simply include environmental sources, for example, ambient sound, vibration, light, and so forth. In addition, as described in greater detail herein, in certain embodiments, the detection components 34 of the building component detection sensor devices 14 may also include other types of detection sensors, such as temperature detection sensors, pressure detection sensors, humidity detection sensors, camera devices configured to capture images relating to building components 16 and/or a building 10 itself, and so forth, which are configured to detect various other properties of building components 16 and/or a building 10 itself.

As also illustrated in FIG. 3, each of the building component detection sensor devices 14 may include communication circuitry 40 configured to communicate data 42 relating to the detected properties of interest for building components 16 of interest to communication circuitry 44 of the building component property determination system 18 via a communication network 46. In certain embodiments, the communication network 46 may include a wireless communication network, such as a WiFi™ network of the building 10, a wireless hot spot network established by the building component detection sensor devices 14, a Bluetooth® network established by the building component detection sensor devices 14, a Zigbee network established by the building component detection sensor devices 14, a ZWave(+) network established by the building component detection sensor devices 14, a LoRaWAN network established by the building component detection sensor devices 14, an RF/IR network established by the building component detection sensor devices 14, or any other suitable wireless network.

As described in greater detail herein, the building component property determination system 18 is configured to determine one or more properties 48 of building components 16 of interest based at least in part on the data 42 received from one or more building component detection sensor devices 14. For example, in certain embodiments, the building component property determination system 18 may include at least one processor 50 configured to execute instructions 52 stored in at least one memory medium 54 of the building component property determination system 18, wherein the instructions 52, when executed by the at least one processor 50, determine the one or more properties 48 of the building components 16 of interest based at least in part on the data 42 received from the one or more building component detection sensor devices 14 for the purpose of inspecting the building 10 that includes the building component 16.

In certain embodiments, the building component property determination system 18 may include a building component database 56 that includes, for example, data 58 relating to various properties 48 of a plurality of building components 16, such as a type of a respective building component 16, type and/or quality of material of a respective building component 16, size (e.g., thickness, depth, width, breadth, and so forth) of a respective building component 16, density of a respective building component 16, integrity of a respective building component 16, and so forth, wherein the data 58 relating to the various properties 48 stored in the building component database 56 correlate to the data 42 detected by the building component detection sensor devices 14. For example, in certain embodiments, the building component property determination system 18 may automatically determine which data 58 relating to the various properties 48 stored in the building component database 56 correlates best with the data 42 detected by the building component detection sensor devices 14, thereby estimating the one or more properties 48 of the building component 16 of interest for the purpose of inspecting the building 10 that includes the building component 16.

As described in greater detail above with respect to FIG. 1, the properties 48 of building components 16 that may be automatically determined by the building component property determination system 18 include, but are not limited to, a type and/or quality of material (e.g., type of tile or wood) of which flooring 16A of the building 10 is comprised, a type and/or quality of material of which siding 16B of the building 10 is comprised, a type and/or quality of material of which a door 16C of the building 10 is comprised, an integrity of the door 16C, a type and/or quality of material (type of a pane of glass of the window 16D, type of safety/UV film of the window 16D, and so forth) of which a window 16D of the building 10 is comprised, an integrity of the window 16D, number of panes of glass of the window 16D, a type of foundation 16E of the building 10, an integrity of the foundation 16E, a degree of termite damage with respect to the foundation 16E, a type and/or quality of material of which a roof 16F of the building 10 is comprised, a type and/or quality of material of the insulation 16G of the building 10, a type or location of pier and beam construction within walls 16H of the building 10, a type or location of plumbing 16I of the building 10, and so forth.

As illustrated in FIG. 3, in certain embodiments, the system 32 may include a building insurance determination system 60 configured to automatically determine insurance rates and/or insurance coverage for the building 10 based at least in part on the one or more properties 48 of a building component 16 of interest determined by the building component property determination system 18. For example, in certain embodiments, the building insurance determination system 60 may include at least one processor 62 configured to execute instructions 64 stored in at least one memory medium 66 of the building insurance determination system 60, wherein the instructions 64, when executed by the at least one processor 62, automatically determine the insurance rates and/or insurance coverage for the building 10 based at least in part on the one or more properties 48 of the building component 16 of interest determined by the building component property determination system 18. In certain embodiments, the building insurance determination system 60 may include communication circuitry 68 configured to facilitate communication with the communication circuitry 44 of the building component property determination system 18, for example, via the communication network 46 or via communication cables 70 that directly communicatively couple the building insurance determination system 60 and the building component property determination system 18.

In certain embodiments, the building component property determination system 18 may automatically determine the one or more properties 48 of a building component 16 of interest based at least in part on a layout of at least a portion of the building 10. For example, the building component property determination system 18 may automatically determine the one or more properties 48 of a building component 16 of interest based at least in part on a size of a room of the building 10 that includes a building component 16 of interest, positioning of walls 16H of the building 10, furniture positioning within a room of the building 10 that includes a building component 16 of interest, and so forth. In certain embodiments, the layout of at least a portion of the building 10 may be at least partially manually entered, for example, by a building inspector. In other embodiments, the layout of at least a portion of the building 10 may be at least partially detected by the detection components 34 of the building component detection sensor devices 14. In other embodiments, the layout of at least a portion of the building 10 may be at least partially detected using wireless signals communicated (e.g., via the communication network 46) within the building 10.

For example, in certain embodiments, a building component detection sensor device 14 or other suitable device (e.g., a user computing device, as described in greater detail herein) may detect the wireless signals while the particular device is being maneuvered within or around the building 10, and may automatically determine at least a portion of the layout of the building 10 based, for example, on signal strength variations detected by the particular device as it moves through or around the building 10. In addition, in certain embodiments, a camera device 14 as described in greater detail herein may capture images and/or video of the building 10, and may automatically determine at least a portion of the layout of the building 10 based on the captured images and/or video. It will be appreciated that, in certain embodiments, the layout of at least a portion of the building 10 may be determined using a combination of the techniques described herein. For example, layout data detected using differing methods may be correlated with each other. In addition, as described in greater detail herein, the detected layout data may be correlated with positional data collected by the respective building component detection sensor devices 14, and may be used to help an associated maneuverable building detection device 12 to determine how to autonomously maneuver itself to bring the building component detection sensor devices 14 in proximity to a building component 16 of interest.

In addition, in certain embodiments, the building component property determination system 18 may automatically determine the one or more properties 48 of a building component 16 of interest based at least in part on relative positioning of the building component detection sensor devices 14 with respect to a building component 16 of interest. For example, in certain embodiments, the building component detection sensor devices 14 may include position sensors 72 configured to automatically determine a position of the respective building component detection sensor device 14. Alternatively, the maneuverable building detection device 12 may include a position sensor 74 configured to automatically determine a position of the maneuverable building detection device 12, which may be used as a proxy for the position of the one or more building component detection sensor devices 14 being carried by the maneuverable building detection device 12. In certain embodiments, the building component property determination system 18 may be configured to automatically determine the relative positioning of the building component detection sensor devices 14 and the building components 16 of interest based on the respective positions of the building component detection sensor devices 14 and the building components 16 of interest.

In addition, in certain embodiments, the positions of the building component detection sensor devices 14 and/or of the maneuverable building detection device 12 determined by the position sensors 72, 74 of the building component detection sensor devices 14 and/or of the maneuverable building detection device 12 may be used by circuitry of the maneuverable building detection device 12 as position feedback for the purpose of controlling autonomous movement of the maneuverable building detection device 12. For example, in certain embodiments, the maneuverable building detection device 12 may use the position feedback to determine how to maneuver itself proximate to a wall 16H, a ceiling 16J, or a floor 16A of the building 10 to bring its respective building component detection sensor devices 14 in proximity with respect to building components 16 of interest.

In addition, in certain embodiments, the building component detection sensor devices 14 may include at least one processor 76 configured to execute instructions 78 stored in at least one memory medium 80 of the respective building component detection sensor device 14, wherein the instructions 78, when executed by the at least one processor 76, cause the respective building component detection sensor device 14 to collect data relating to building components 16 of interest, as described in greater detail herein. Similarly, in certain embodiments, the maneuverable building detection devices 12 may also include at least one processor 82 configured to execute instructions 84 stored in at least one memory medium 86 of the respective maneuverable building detection device 12, wherein the instructions 84, when executed by the at least one processor 82, cause the respective maneuverable building detection device 12 to maneuver one or more building component detection sensor devices 14 attached to the respective maneuverable building detection device 12 based on control signals received, for example, via communication circuitry 88 of the respective maneuverable building detection device 12 from the building component property determination system 18 and/or the remote control device 20 (e.g., in embodiments where the respective maneuverable building detection device 12 is controlled, for example, by a building inspector).

However, in other embodiments, the instructions 84, when executed by the at least one processor 82, cause the respective maneuverable building detection device 12 to autonomously maneuver itself, for example, based at least in part on position feedback provided by position sensors 72, 74 of the building component detection sensor devices 14 and/or of the maneuverable building detection device 12, by a camera of a building component detection sensor device 14, or by other components of the building component detection sensor devices 14 and/or of the maneuverable building detection device 12. For example, in certain embodiments, the instructions 84, when executed by the at least one processor 82, cause the respective maneuverable building detection device 12 to align its respective wheels 28, 30 with a wall 16H, a ceiling 16J, or a floor 16A of the building 10 to bring its respective building component detection sensor devices 14 in proximity with respect to building components 16 of interest. In addition, in certain embodiments, the instructions 84, when executed by the at least one processor 82, cause the respective maneuverable building detection device 12 to maneuver itself based at least in part on a layout of a building 10 within or around which the maneuverable building detection device 12 is moving to bring its respective building component detection sensor devices 14 in proximity with respect to building components 16 of interest.

As described in greater detail herein, in certain embodiments, a combination of automatic maneuvering and manual maneuvering of the maneuverable building detection device 12 may be used. For example, in certain embodiments, the maneuverable building detection device 12 may be configured to operate in both a manual maneuvering mode and an autonomous maneuvering mode, and the instructions 84, when executed by the at least one processor 82, cause the respective maneuverable building detection device 12 to switch between the maneuvering modes depending on a setting of the maneuverable building detection device 12, which may be toggled by a user of the maneuverable building detection device 12, for example.

In embodiments where a remote control device 20 is used to manually control a maneuverable building detection device 12, the remote control device 20 may also include at least one processor 90 configured to execute instructions 92 stored in at least one memory medium 94 of the respective remote control device 20, wherein the instructions 92, when executed by the at least one processor 90, cause the respective remote control device 20 to send appropriate control signals to the maneuverable building detection device 12, for example, via communication circuitry 96 of the respective remote control device 20. In certain embodiments, the control signals sent to the maneuverable building detection device 12 may be based on inputs received via one or more input devices 98 of the respective remote control device 20.

Figure 4:
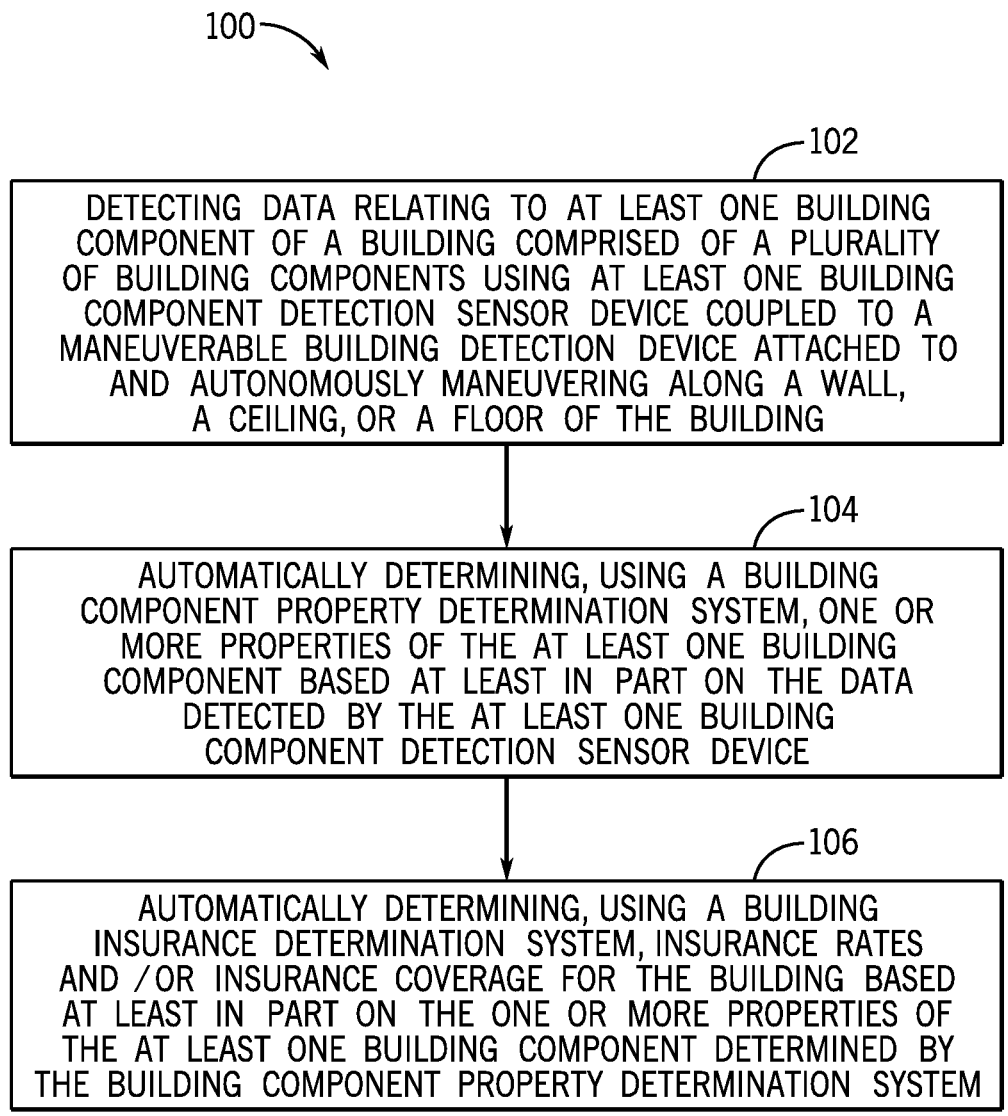
FIG. 4 is a flow diagram of a method of operating the system of FIG. 3, in accordance with embodiments described herein.

FIG. 4 is a flow diagram of a method 100 of operating the system 32 of FIG. 3. As illustrated in FIG. 4, in certain embodiments, the method 100 includes detecting data relating to at least one building component 16 of a building 10 comprised of a plurality of building components 16 using at least one building component detection sensor device 14 coupled to a maneuverable building detection device 12 attached to and autonomously maneuvering along a wall 16H, a ceiling 16J, or a floor 16A of the building 10 (block 102). In addition, in certain embodiments, the method 100 includes automatically determining, using a building component property determination system 18, one or more properties of the at least one building component 16 based at least in part on the data detected by the at least one building component detection sensor device 14 (block 104). In addition, in certain embodiments, the method 100 includes automatically determining, using a building insurance determination system 60, insurance rates and/or insurance coverage for the building 10 based at least in part on the one or more properties of the at least one building component 16 determined by the building component property determination system 18 (block 106).

As described in greater detail herein, in certain embodiments, the maneuverable building detection devices 12 described herein may be configured to automatically (e.g., without human intervention) maneuver themselves, for example, based at least in part on data detected by one or more building component detection sensor devices 14 coupled to the respective maneuverable building detection device 12. For example, in certain embodiments, processing circuitry of the one or more building component detection sensor devices 14 and/or of the respective maneuverable building detection device 12, described in greater detail herein, may be configured to determine a location of a particular building component 16 of interest (e.g., using images and/or video captured by one or more camera devices 14 coupled to the respective maneuverable building detection device 12), and the processing circuitry of the respective maneuverable building detection device 12 may maneuver itself toward the particular building component 16 of interest to enable one or more of its associated building component detection sensor devices 14 to detect certain properties of interest relating to the particular building component 16 of interest. In addition, even once the maneuverable building detection device 12 has maneuvered itself proximate a particular building component 16 of interest, the maneuverable building detection device 12 may then change positioning of itself into different positions to enable different building component detection sensor devices 14 to be positioned relative to the particular building component 16 of interest at different times so that the building component detection sensor devices 14 may effectively detect their respective data relating to the particular building component 16 of interest.

Furthermore, in certain embodiments, the maneuverable building detection devices 12 described herein may be configured to automatically (e.g., without human intervention) maneuver themselves to avoid furniture, fixtures, and other obstacles in and around the building 10, for example, based on the layout of the building 10, which is detected as described in greater detail herein. For example, as illustrated in FIG. 2, if a maneuverable building detection device 12 approaches a piece of furniture 108 disposed within the building 10, a building component detection sensor device 14 (e.g., a camera device, a position sensing device, and so forth) coupled to the maneuverable building detection device 12 may detect the presence of the piece of furniture 108, and the maneuverable building detection device 12 may maneuver itself around the piece of furniture 108 to avoid collision with the piece of furniture 108.

As described in greater detail herein, the building component property determination system 18 and the building insurance determination system 60 may automatically perform calculations (e.g., determination of properties of building components 16 of interest, determination of insurance rates and/or insurance coverage for a building 10 of interest, and so forth) on the data detected by the building component detection sensor devices 14 in substantially real time. In addition, in certain embodiments, the building component property determination system 18 and/or the building insurance determination system 60 may also send control signals to one or more user computing devices 110 (e.g., smart phones, wearable computing devices, personal computers, tablet computers, laptop computers, and so forth) to notify users 112 in substantially real time regarding these calculations. For example, in certain embodiments, the control signals sent to the one or more user computing devices 110 may cause the one or more user computing devices 110 to automatically (e.g., without human intervention) launch an application 114 via the respective user computing device 110 such that messages relating to the calculations performed by the building component property determination system 18 and/or the building insurance determination system 60 may be presented to a user 112 associated with the respective user computing device 110. Indeed, in certain embodiments, the building component property determination system 18 and/or the building insurance determination system 60 may be configured to automatically (e.g., without human intervention) send control signals to the one or more user computing devices 110 to automatically (e.g., without human intervention) launch the application 114 via specific communication channels to minimize the impact that the communication between the building component property determination system 18 and/or the building insurance determination system 60 and the one or more user computing devices 110 has on other applications running on the one or more user computing devices 110, for example.

As illustrated in FIG. 2, in certain embodiments, the user computing device(s) 110 may include at least one communication component 116, at least one processor 118, at least one memory 120, and at least one storage device 122, as well as other processing circuitry that enable the user computing device(s) 110 to launch the application 114 being executed on the user computing device(s) 110. In addition, in certain embodiments, the user computing device(s) 110 described herein may also include a display 124 and at least one input 126, which may facilitate a user 112 interacting with a respective user computing device 110. For example, in certain embodiments, a user 112 of a user computing device 110 may manipulate the input(s) 126 of a user computing device 110 (e.g., by pressing a button, sliding an adjustable indicator, using voice commands, using gestures, and/or other suitable techniques) to manipulate one or more graphical user interfaces displayed on the display 124 via the application 114 being executed by the processor(s) 118 of the user computing device 110, as described in greater detail herein.

Figure 5A:
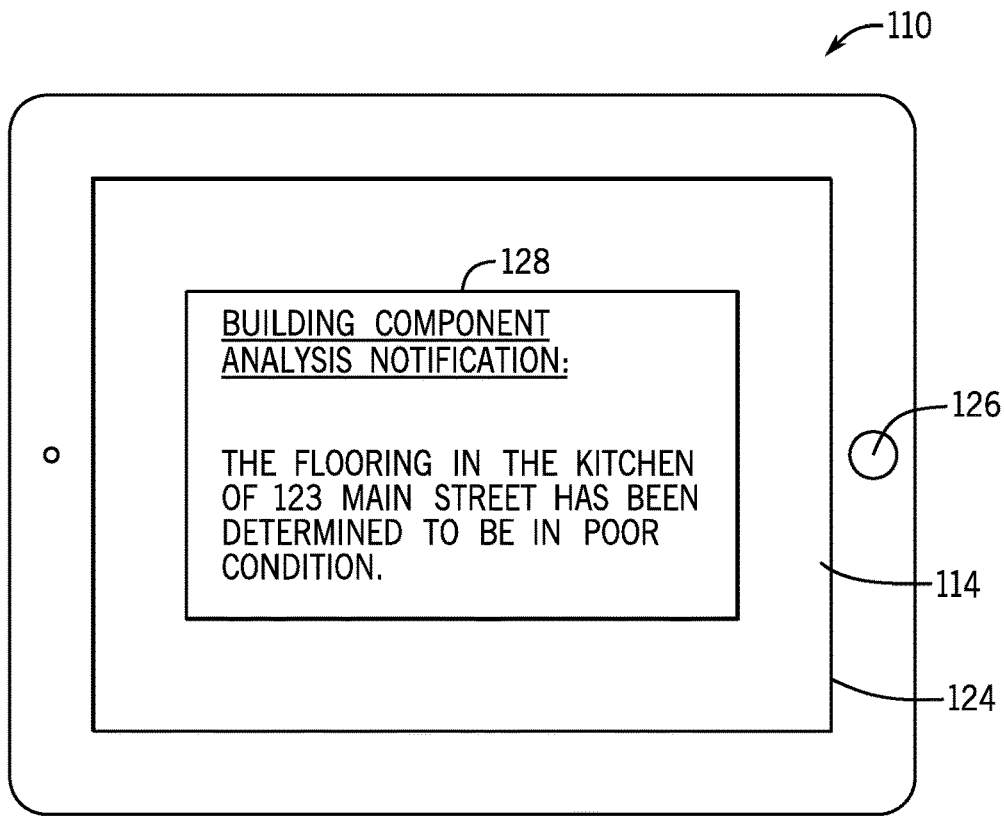
FIG. 5A illustrates a notification being presented to a user via an application when a particular property for a particular building component of interest has been analyzed, in accordance with embodiments described herein.
Figure 5B:
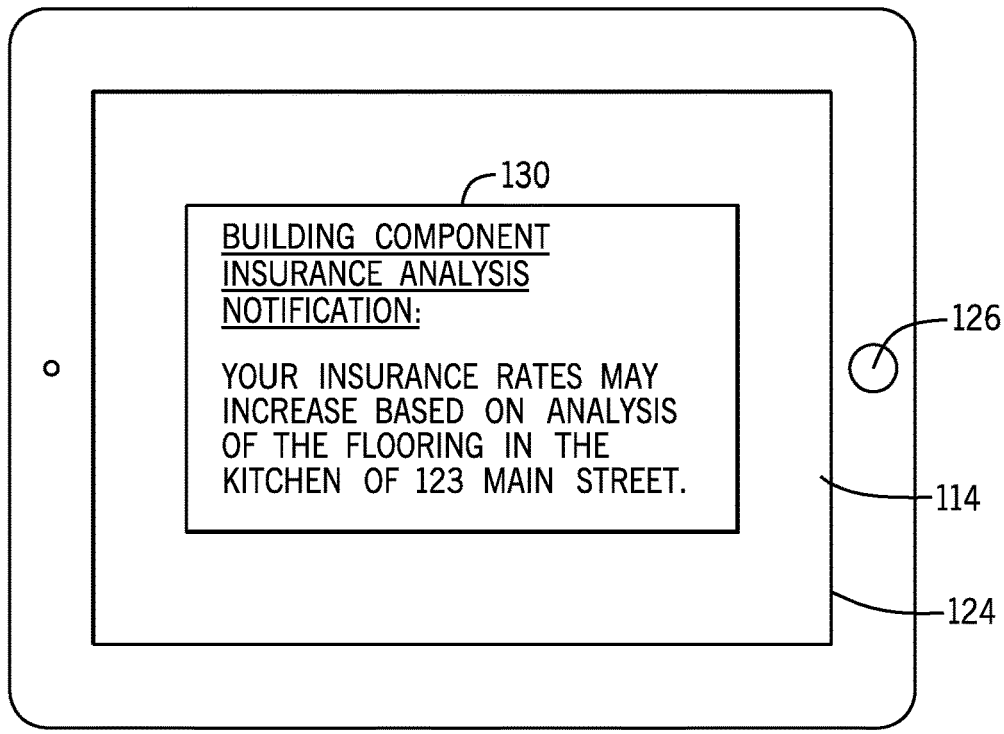
FIG. 5B illustrates a notification being presented to a user via an application when insurance rates and/or insurance coverage have been affected, in accordance with embodiments described herein.
Figure 5C:
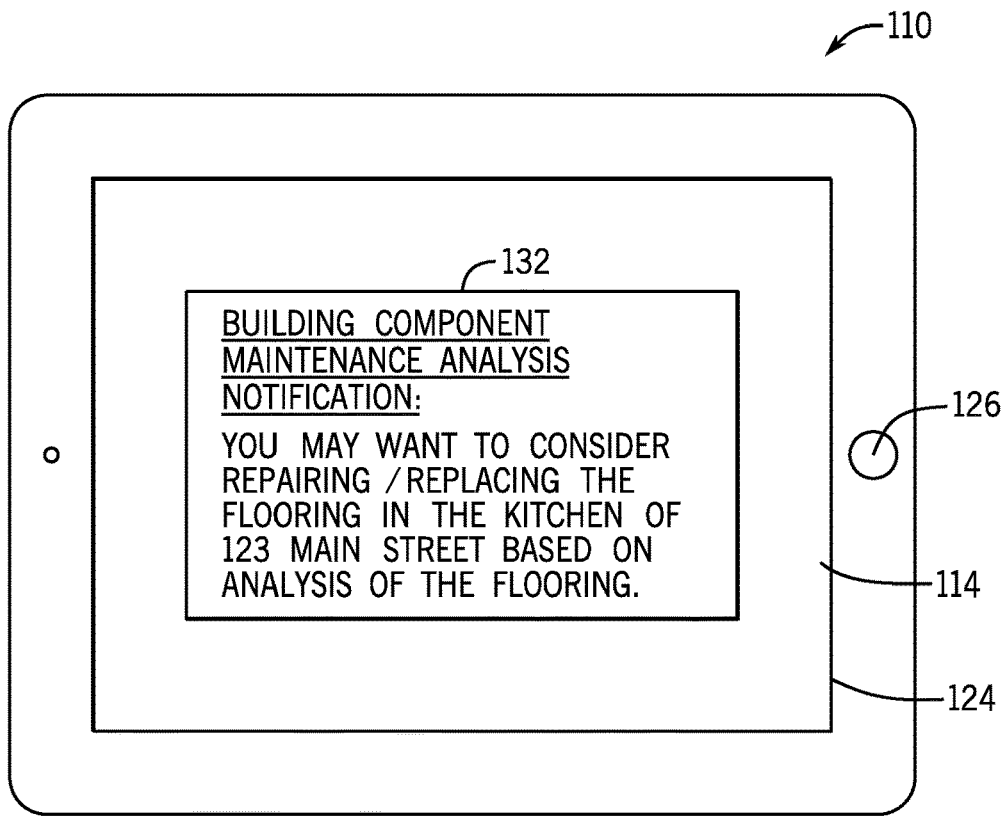
FIG. 5C illustrates a notification being presented to a user via an application when maintenance (e.g., repair or replacement) of a particular building component of interest is recommended, in accordance with embodiments described herein.
Figure 5D:
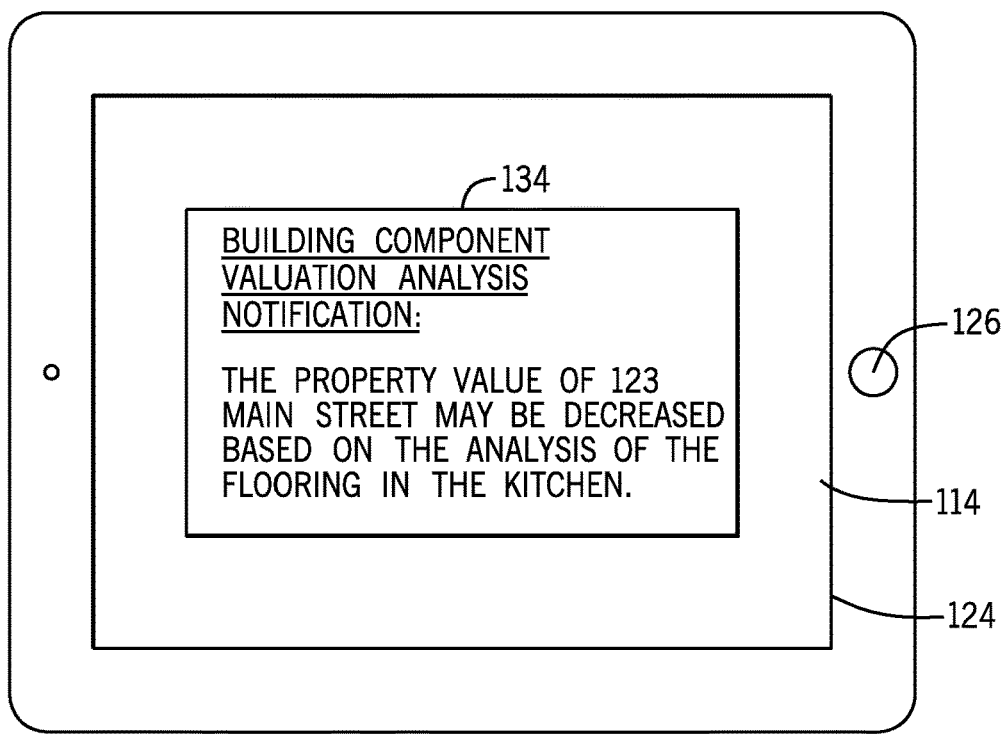
FIG. 5D illustrates a notification being presented to a user via an application when property value of a building having a particular building component of interest may be adjusted, in accordance with embodiments described herein.

Many different types of notifications may be presented to the users 112 via the application 114. For example, FIG. 5A illustrates a notification 128 being presented to a user 112 via the application 114 when a particular property for a particular building component 16 of interest has been analyzed by the building component property determination system 18. In addition, FIG. 5B illustrates a notification 130 being presented to a user 112 via the application 114 when insurance rates and/or insurance coverage have been affected, for example, based on analysis performed by the building insurance determination system 60. In addition, FIG. 5C illustrates a notification 132 being presented to a user 112 via the application 114 when maintenance (e.g., repair or replacement) of a particular building component 16 of interest is recommended, for example, based on analysis performed by the building component property determination system 18 and/or the building insurance determination system 60. In addition, FIG. 5D illustrates a notification 134 being presented to a user 112 via the application 114 when property value of a building 10 having a particular building component 16 of interest may be adjusted, for example, based on analysis performed by the building component property determination system 18 and/or the building insurance determination system 60.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. § 112(f). However, for any claims containing elements designated in any other manner, it is intended that such elements are not to be interpreted under 35 U.S.C. § 112 (f).

The invention claimed is:

1. A system, comprising:
a maneuverable building detection device configured to attach to and autonomously maneuver along a wall, a ceiling, and a floor of a building comprised of a plurality of building components using a plurality of surface-attachable wheels of the maneuverable building detection device, wherein the maneuverable building detection device is coupled to at least one building component detection sensor device, each building component detection sensor device configured to detect data relating to at least one building component of the plurality of building components, wherein the maneuverable building detection device is configured to autonomously maneuver itself along the wall, the ceiling, or the floor of the building based at least in part on feedback relating to a position of attachment of the maneuverable building detection device relative to the at least one building component, and wherein the position of attachment of the maneuverable building detection device relative to the at least one building component is detected by the at least one building component detection sensor device;
a building component property determination system configured to automatically determine one or more properties of the at least one building component based at least in part on the data detected by the at least one building component detection sensor device, wherein the data detected by the at least one building component detection sensor device relates to sound, vibration, or light emitted from the at least one building component detection sensor device and reflected off of the at least one building component, and wherein the maneuverable building detection device is configured to autonomously adjust the position of attachment of the maneuverable building detection device along the wall, the ceiling, or the floor of the building relative to the at least one building component using the plurality of surface-attachable wheels of the maneuverable building detection device based at least in part on the data detected by the at least one building component detection sensor device; and a building insurance determination system configured to automatically determine insurance rates and/or insurance coverage for the building based at least in part on the one or more properties of the at least one building component determined by the building component property determination system.

2. The system of claim 1, wherein the one or more properties of the at least one building component comprises a type of material and/or condition of the at least one building component.

3. The system of claim 1, wherein the building component property determination system is configured to automatically determine the one or more properties of the at least one building component based at least in part on relative positioning of the at least one building component detection sensor device and the at least one building component.

4. The system of claim 1, wherein the building component property determination system is configured to automatically determine the one or more properties of the at least one building component based at least in part on a layout of at least a portion of the building.

5. The system of claim 1, wherein the maneuverable building detection device is configured to fly within or around the building.

6. The system of claim 1, wherein the maneuverable building detection device comprises a sampling device configured to take a sample of the at least one building component while the maneuverable building detection device autonomously maneuvers itself along the wall, the ceiling, or the floor of the building using the plurality of surface-attachable wheels of the maneuverable building detection device.

7. The system of claim 1, wherein the at least one building component detection sensor device comprises a combination of a visible light camera and an infrared camera, wherein the at least one building component detection sensor device is configured to automatically switch operation between the visible light camera and the infrared camera based at least in part on a type of the at least one building component.

8. The system of claim 1, wherein the at least one building component comprises flooring of the building, siding of the building, a door of the building, a window of the building, a foundation of the building, a roof of the building, or some combination thereof.

9. The system of claim 1, wherein the at least one building component detection sensor device comprises a sound detection sensor device, a vibration detection sensor device, a light detection sensor device, a temperature detection sensor device, a pressure detection sensor device, a humidity detection sensor device, a moisture detection sensor device, a camera device, or any combination thereof.

10. The system of claim 1, wherein the plurality of surface-attachable wheels comprises adhesive wheels.

11. The system of claim 1, wherein the plurality of surface-attachable wheels comprises vacuum adhesion wheels.

12. A method, comprising:

autonomously maneuvering a maneuverable building detection device along a wall, a ceiling, and a floor of a building using a plurality of surface-attachable wheels of the maneuverable building detection device based at least in part on feedback relating to a position of attachment of the maneuverable building detection device relative to at least one building component of a building comprised of a plurality of building components, wherein the position of attachment of the maneuverable building detection device relative to the at least one building component of the plurality of building components is detected by at least one building component detection sensor device coupled to the maneuverable building detection device;

detecting data relating to the at least one building component of the building using the at least one building component detection sensor device coupled to the maneuverable building detection device;

automatically determining, using a building component property determination system, one or more properties of the at least one building component based at least in part on the data detected by the at least one building component detection sensor device, wherein the data detected by the at least one building component detection sensor device relates to sound, vibration, or light emitted from the at least one building component detection sensor device and reflected off of the at least one building component;

autonomously adjusting, via the maneuverable building detection device, the position of attachment of the maneuverable building detection device along the wall, the ceiling, or the floor of the building relative to the at least one building component using the plurality of surface-attachable wheels of the maneuverable building detection device based at least in part on the data detected by the at least one building component detection sensor device; and automatically determining, using a building insurance determination system, insurance rates and/or insurance coverage for the building based at least in part on the one or more properties of the at least one building component determined by the building component property determination system.

13. The method of claim 12, comprising automatically determining, using the building component property determination system, the one or more properties of the at least one building component based at least in part on relative positioning of the at least one building component detection sensor device and the at least one building component.

14. The method of claim 12, comprising automatically determining, using the building component property determination system, the one or more properties of the at least one building component based at least in part on a layout of at least a portion of the building.

15. The method of claim 12, comprising maneuvering the maneuverable building detection device along the wall, the ceiling, or the floor of the building based at least in part on control signals received from a remote control device.

16. The method of claim 12, wherein the at least one building component detection sensor device comprises a sound detection sensor device, a vibration detection sensor device, a light detection sensor device, a temperature detection sensor device, a pressure detection sensor device, a humidity detection sensor device, a moisture detection sensor device, a camera device, or any combination thereof.

17. The method of claim 12, comprising taking a sample of the at least one building component using a sampling device of the maneuverable building detection device while the maneuverable building detection device autonomously maneuvers along the wall, the ceiling, or the floor of the building using the plurality of surface-attachable wheels of the maneuverable building detection device.

18. A system, comprising:
a maneuverable building detection device configured to attach to and autonomously maneuver along a wall, a ceiling, and a floor of a building comprised of a plurality of building components using a plurality of surface-attachable wheels of the maneuverable building detection device, wherein the maneuverable building detection device is coupled to at least one building component detection sensor device configured to detect data relating to at least one building component of the plurality of building components, wherein the maneuverable building detection device is configured to autonomously maneuver itself based at least in part on feedback relating to a position of attachment of the maneuverable building detection device relative to the at least one building component, wherein the position of attachment of the maneuverable building detection device relative to the at least one building component is detected by the at least one building component detection sensor device, and wherein the at least one building component detection sensor device comprises a sound detection sensor device, a vibration detection sensor device, a light detection sensor device, a temperature detection sensor device, a pressure detection sensor device, a humidity detection sensor device, a moisture detection sensor device, a camera device, or any combination thereof,
a building component property determination system configured to automatically determine one or more properties of the at least one building component based at least in part on the data detected by the at least one building component detection sensor device, wherein the data detected by the at least one building component detection sensor device relates to sound, vibration, or light emitted from the at least one building component detection sensor device and reflected off of the at least one building component, and wherein the maneuverable building detection device is configured to autonomously adjust the position of attachment of the maneuverable building detection device along the wall, the ceiling, or the floor of the building relative to the at least one building component using the plurality of surface-attachable wheels of the maneuverable building detection device based at least in part on the data detected by the at least one building component detection sensor device; and
a building insurance determination system configured to automatically determine insurance rates and/or insurance coverage for the building based at least in part on the one or more properties of the at least one building component determined by the building component property determination system.

19. The system of claim 18, wherein the maneuverable building detection device comprises a sampling device configured to take a sample of the at least one building component while the maneuverable building detection device autonomously maneuvers along the wall, the ceiling, or the floor of the building using the plurality of surface-attachable wheels of the maneuverable building detection device.

* * * * *